United States Patent Office 3,248,414
Patented Apr. 26, 1966

3,248,414
METHOD OF PREPARING HIGH MOLECULAR WEIGHT POLYCARBONATES
Henry C. Stevens, Akron, Ohio, assignor to Pittsburgh Plate Glass Company, Pittsburgh, Pa., a corporation of Pennsylvania
No Drawing. Continuation of application Ser. No. 758,613, Sept. 2, 1958. This application Jan. 16, 1963, Ser. No. 251,769
10 Claims. (Cl. 260—463)

This application is a continuation of my application Serial No. 758,615, filed September 2, 1958, now abandoned, which application is a continuation-in-part of my application Serial No. 614,071, filed October 5, 1956, now abandoned.

The present invention deals with a novel process for preparing high molecular weight polycarbonates from cyclic carbonates such as ethylene carbonate.

Now it has been discovered that high molecular weight polycarbonates, especially polycarbonates having terminal hydroxyl groups, molecular weights of 700 to 5000, and hydroxyl numbers of 20 or 25 to 170 may be prepared efficiently and simply from cyclic carbonates such as ethylene carbonate. Since ethylene carbonate is relatively inexpensive, these valued high molecular weight polycarbonates are obtained in an economically attractive process by virtue of this discovery.

According to this invention, high molecular weight polycarbonates are formed by heating ethylene carbonate or like cyclic carbonate with 0.01 to 0.2 moles and preferably 0.02 to 0.10 moles of an organic compound containing 2 or more active hydrogens, notably polyhydric alcohol per mole of cyclic carbonate above 100° C., usually 150° C. to 250° C., in the presence of a catalytic concentration of a base catalyst such as potassium carbonate. Carbon dioxide evolution accompanies the formation of polycarbonate in this process. This evolution of carbon dioxide results in the development of autogenous superatmospheric pressures as high as 2000 or 3000 pounds per square inch when the process is performed in a closed reactor, e.g. an autoclave, as is normally convenient.

High molecular weight polycarbonates hereby prepared are comprised of a multiplicity of carbonate and glycol residues terminated by hydroxyl groups. The following structure characterizes the polycarbonates formed from ethylene carbonate:

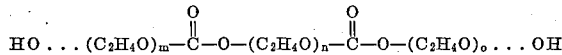

wherein $m$, $n$, and $o$ are whole positive integers of 1 or greater but are not normally greater than 8. The repeating $(CH_2-CH_2-O)$ polyethylene oxide units may vary in length. Hence, subscripts $m$, $n$, $o$, etc. may represent varying values. This denotes a degree of randomness in the high molecular weight polycarbonate. Between 2 and 20, and more usually 3 to 10 carbonate units

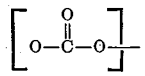

are in the individual polycarbonate molecule.

Most of the thusly prepared high molecular weight polycarbonates vary from light amber to dark amber in color. They are generally rather viscous, syrupy liquids, although some are waxy solids.

Performance of this invention involves charging a polyhydric alcohol or like organic compound having 2 or more active hydrogens such as diethylene glycol and an alkylene carbonate such as ethylene carbonate to an autoclave (or like reaction vessel designed to withstand elevated pressure) in the ratio 0.01 to 0.20 moles (and preferably 0.02 to 0.01 moles) of the polyhydric alcohol per mole of alkylene carbonate. Included in the charge is a catalytic concentration, usually 0.01 to 2.0 weight percent of the carbonate, of potassium carbonate or equivalent base catalyst. With the reactor sealed, the contents are raised by heating to above 100° C. and more particularly to a temperature in excess of 150° C. and below that at which there is a tendency for substantial rupture or decomposition of the polycarbonate to occur.

At the outset, and under the conditions which prevail in the reactor, the pressure within the reactor may range upwards of atmospheric or slightly super-atmospheric. For example, the initial pressure may be 10 to 50 pounds per square inch gauge, or the pressure may be considerably higher such as 100 to 400 pounds per square inch gauge. As polycarbonate formation occurs, pressure in the reactor increases. Pressures in excess of 1000 pounds per square inch gauge and as high as 3000 pounds per square inch gauge may ultimately develop in the reactor, apparently autogenously generated by evolution of carbon dioxide, a by-product of polycarbonate formation in this process.

The reactor contents are maintained at the elevated temperatures in excess of 100° C. for a substantial time period. Heating periods of 4 to 30 hours, or even somewhat longer, are quite frequently found desirable to secure good conversion of the cyclic carbonate to high molecular weight polycarbonates. Periods of less than an hour or two, while operative, do not as a general rule provide sufficient conversion to the desired product to render them commercially attractive. Periods greater than 24 hours do not apparently offer benefits justifying their use.

Temperatures at which the polycarbonates evidence a tendency to rupture or decompose substantially have been found to be primarily in excess of 250° C., although the exact temperature at which the polycarbonate degradation becomes excessive is also dependent upon the particular polycarbonate and length of treatment at the specified temperature. Used mainly and recommended are temperatures between 150° C. and 225° C. Within this range, good rates of conversion are realized and there is no series or substantial decomposition or rupture of the polycarbonate product.

It is important for the satisfactory preparation of high molecular polycarbonates from cyclic carbonates in accordance with the present invention that the ratio of polyhydric alcohol (or other organic compound having 2 or more active hydrogens) to cyclic carbonate be carefully regulated from 0.01 to 0.2 moles and preferably 0.02 to 0.1 moles of polyhydric alcohol per mole of cyclic carbonate. The precise ratio of polyhydric alcohol to cyclic carbonate is the prime determinant of the molecular weight of the polycarbonate. Employing between 0.02 and 0.05 moles of polyhydric alcohol per mole of cyclic carbonate provides polycarbonates of molecular weights in the upper portion of the range, e.g. on the order of 2000 to 5000 molecular weight. The lower molecular weight polycarbonates, e.g. polycarbonates of 700 to 1500 molecular weight, are produced when from 0.08 to 0.10 moles of polyhydric alcohol per mole of cyclic carbonates is the ratio.

The following examples demonstrate the preparation of high molecular weight polycarbonates from an illustrative cyclic carbonate in accordance with the present invention.

EXAMPLE I

A mixture of 68.5 grams (0.779 mole) of ethylene carbonate, 3.1 grams (0.05 mole) of ethylene glycol and 0.1 gram of potassium carbonate was heated at 24 hours at a temperature of 200° C. in a closed reaction vessel. At the outset, the pressure in the closed vessel was 40 pounds per square inch gauge. At the conclusion of the 24-hour period the pressure was 980 pounds per square inch gauge in the reactor at 200° C.

After expelling any gases in the system and permitting the reaction product mixture to cool, the crude reaction product was purified by vacuum distillation. A total of 7.6 grams of unreacted ethylene carbonate was collected by topping at 160° C. at a 2 millimeters mercury pressure from the crude reaction product. Some 34.5 grams of high molecular weight polycarbonate rather viscous, amber, liquid composition having a hydroxyl number of 158, an approximate molecular weight of 710 and analyzing 11.8 weight percent $CO_2$ were produced in this manner.

EXAMPLE II

A mixture of 88.5 grams (1.005 moles) of ethylene carbonate, 3.5 grams (0.032 mole) of diethylene glycol and 0.05 gram of potassium carbonate was heated for 24 hours at 200° C. in a closed reaction vessel. The initial pressure in the system was 150 pounds per square inch gauge. At the end of the 24-hour heating period, the pressure in the reactor was 1350 pounds per square inch gauge.

After vacuum topping, 39.7 grams of polycarbonate composition having an approximate molecular weight of 1300, a hydroxyl number of 87, and containing 13.8 weight percent $CO_2$ were obtained.

EXAMPLE III

Example II is duplicated except that 0.032 mole of piperazine is used in lieu of the diethylene glycol. A polycarbonate composition is obtained having a molecular weight approximating 1300.

EXAMPLE IV

Example II is duplicated except that 0.032 mole of 1,2-ethanedithiol is used in lieu of the diethylene glycol to obtain a polycarbonate composition of about 1300 molecular weight.

Besides potassium carbonate, specifically illustrated in the above examples, other catalysts classified by the art as base catalysts appropriately catalyze or facilitate the production of polycarbonates from cyclic carbonates. Illustrative base catalysts include inorganic bases such as alkali carbonates among which are potassium carbonate, sodium carbonate, calcium carbonate and magnesium carbonate; alkali hydroxides such as sodium hydroxide, potassium hydroxide and calcium hydroxide; and alkaline bicarbonates such as sodium bicarbonate. Other inorganic base catalysts including trisodium phosphate are applicable. Useful organic base catalysts include the tertiary amines such as tertiary aliphatic amines, including trimethyl amine, triethyl amine, and tripropyl amine. Heterocyclic tertiary amines such as methylmorpholine and pyridine are also satisfactory.

As has been hereinbefore described, catalytic concentrations between 0.01 and 2.0 weight percent catalysts basis the cyclic carbonates are adequate. Higher catalyst concentrations upwards of 2 percent, say 5 to 10 weight percent, are not usually found to offer added advantage. Hence, they are not generally recommended.

The importance of including between 0.01 and 0.2 moles, and preferably between 0.02 to 0.10 moles of a polyhydric alcohol per mole of cyclic carbonate in the reaction medium subjected to the elevated temperatures and other herein described conditions has already been discussed. Apparently, the polyhydric alcohol or other organic compound having 2 or more active hydrogens serves as the chemical instrumentality by which the cyclic carbonate is converted into high molecular weight polycarbonates.

Most prominently employed polyhydric alcohols are the dihydric alcohols or diols such as glycol or polyglycols. Thus, preferred polyhydric alcohols are the dihydric alcohols represented by the structure HO—R—OH wherein R represents an alkylene radical or a polyalkylene ether radical. Among such dihydric alcohols are glycol, dimethylene glycol, diethylene glycol, triethylene glycol, propylene glycol, dipropylene glycol and other dihydric acohols of less than 10 carbon atoms and no more than 4 ether linkages. Polyhydric alcohols such as the triols illustrated by glycerol, more preferably, trimethylolethane, trimethylolpropane and the tetrols such as pentaerythritol may be also employed with the reservation that these polyhydric alcohols favor cross-linking and hence when employed give rise to 3-dimensional high molecular weight polycarbonates. Other diols including cycloaliphatic diols such as 1,3-dihydroxycyclopentane and aromatic diols such as resorcinol, bisphenols, xylene diols and the like are permissible.

Dihydric alcohols are usually added as such with the cyclic carbonates to the reactor. However, dihydric alcohols formed in situ, e.g. formed in the reaction vessel already containing cyclic carbonate from the reaction of components which yield dihydric alcohols, are effective. For example, water in the specified concentration may be added to generate at the temperatures of polycarbonate formation a dihydric alcohol by reaction with the cyclic carbonate or a decomposition product of the cyclic carbonate.

While polyhydric alcohols are preferred, other organic compounds having 2 or more, preferably from 2 to 4 active hydrogens may be used. Active hydrogen as herein intended denotes a hydrogen of the type which is linked directly to a nitrogen, sulfur or oxygen atom. Thus, organic compounds having 2 or more hydroxyl, nontertiary amino, mercapto, carboxylic and carbamate groups or combinations thereof are contemplated. Polyamines and principally diamines including ethylene diamine, trimethylene diamine, tetramethylene diamine, pentamethylene diamine, hexamethylene diamine are of use. Preferred, however, are diamines such as piperazine wherein each nitrogen contains but one active hydrogen (or diamines having secondary amino groups). Also of value are the mercaptans which correspond to the enumerated polyhydric alcohols such as 1,2-ethanedithiol. Alkylol amines such as ethanolamine and diethanolamine are representative of organics having 2 or more active hydrogens contributed by hydrogens linked to different atoms, e.g. oxygen and nitrogen.

The following example illustrates the manner in which dihydric alcohols may be generated in situ in the formation of high molecular weight polycarbonates from cyclic carbonates.

EXAMPLE V

A mixture of 88.1 grams (1.0 mole) of ethylene carbonate, 0.6 gram (0.033 mole) of water and 0.1 gram of potassium carbonate was heated for 24 hours at 200° C. in a closed reaction vessel. At the outset, when the temperature reached 200° C., the pressure in the reactor was 160 pounds per square inch gauge. At the conclusion of the 24-hour heating period, the pressure in the reactor had risen to 500 pounds per square inch gauge.

Recovered from the reaction mixture in the reactor was 25.5 grams of a polycarbonate composition having a hydroxyl number of 108, an approximate molecular weight of 1040 and containing 14.4 weight percent $CO_2$.

While the foregoing examples have illustrated the conversion of ethylene carbonate to high molecular weight polycarbonates, the present invention is applicable to the conversion of other comparable cyclic carbonates to high molecular weight polycarbonates. Thus, other five-membered cyclic carbonates such as alkylene carbonates (carbonates derived from 1,2 glycols) are useful. For the most part, these alkylene carbonates contain from 3 to 6 carbon atoms inclusive. Some such specific alkylene carbonates include propylene carbonate, 1,2 butylene carbonate, 2,3 butylene carbonate, vinyl ethylene carbonate and 1,2 propylene carbonate. These suitable cyclic carbonates contain the radical:

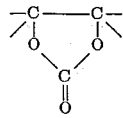

wherein the unsatisfied valences of the carbon atoms as above depicted are in part or completely satisfied with hydrogen, alkyl and alkenyl radicals.

Vinylene carbonate and other such cyclic carbonate which includes an unsaturated carbon to carbon bond in their ring such as methyl vinylene carbonate, ethyl vinylene carbonate, propyl vinylene carbonate, and dimethyl vinylene carbonate may be employed to obtain high molecular weight polycarbonates containing olefinic unsaturation. These unsaturated cyclic carbonates are less desirable than the alkylene carbonates because they are more expensive.

High molecular polycarbonates herein produced may be reacted with carboxylic acid by virture of their hydroxyl groups. When condensed with polycarboxylic acids, especially dicarboxylic acids, including phthalic, adipic, succinic, maleic and fumaric acids valuable alkyd type resins result. Such alkyd resins find use as molding products, laminating resins, coating agents for wood and metals such as iron and steel, impregnants for woven fibrous materials such as cotton, rayon, wool, and may be used as protective coating agents for covering sheet like materials such as glass, polyethylene sheeting, etc.

These polycarbonates are reactive with isocyanates and yield urethanes. With polyisocyanates such as toluene diisocyanates, polyurethanes are prepared. Such polyurethanes are rubbery in character and may serve as alternatives for natural and other synthetic rubbers. Polyurethane foams prepared by reaction of these polycarbonates and polyisocyanates in the presence of minor quantities of water or other foaming agents are valuable products. Elastic foams of this character serve as crash pads or upholstery pillows. Rigid foams, formed by this reaction and the inclusion of a cross-linking agent such as glycerol or other trihydric components, find value as insulating materials in aircraft, insulation for heating and cooling ducts and similar insulating uses.

It will be appreciated that the high molecular polycarbonate products produced by this invention are in all probability not one or several inisolatable compounds. Instead, the product is a polycarbonate composition undoubtedly comprised of a multitude of high molecular weight molecules.

Although the present invention has been described with reference to specific details of certain embodiments, it is not intended that the invention be construed as being limited to such details except insofar as they appear in the appended claims.

What is claimed is:
1. A method of preparing high molecular weight polycarbonate composition which comprises heating an alkylene carbonate of 3 to 6 carbon atoms containing the radical

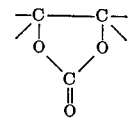

wherein the unsatisfied valances of the carbon atoms are satisfied with a radical selected from the group consisting of hydrogen, alkyl and alkenyl and 0.02 to 0.1 moles of an organic compound having 2 active hydrogens per mole of said alkylene carbonate in the presence of base catalyst to between 100° C. and 250° C. whereby to form high molecular weight polycarbonate composition and evolve carbon dioxide, said organic compound being selected from the group consisting of alkylene diamines containing 2 to 6 carbon atoms, dihydric alcohols of the formula HO—R—OH wherein R is selected from the group consisting of alkylene and polyalkylene ether radicals containing up to 10 carbon atoms and up to 4 ether linkages and mercaptans corresponding to said dihydric alchols.

2. The method of claim 1 wherein the dihydric alcohol is 1,2-ethanedithiol.

3. A method of preparing high molecular weight polycarbonate composition which comprises heating ethylene carbonate and 0.02 to 0.1 moles of a dihydric alcohol per mole of the ethylene carbonate in the presence of base catalyst to between 100° C. and 250° C. whereby to form high molecular weight polycarbonate composition and evolve carbon dioxide, said dihydric alcohol having the formula HO—R—OH wherein R is selected from the group consisting of alkylene and polyalkylene ether radicals and containing up to 10 carbon atoms and up to 4 ether linkages.

4. The method of claim 3 wherein the base catalyst is an inorganic alkaline compound.

5. A method of preparing high molecular weight polycarbonate composition which comprises heating ethylene carbonate and 0.01 to 0.20 moles of a dihydric alcohol per mole of the ethylene carbonate in the presence of base catalyst to above 100° C. and below a temperature at which substantial rupture of high molecular weight polycarbonate occurs whereby to form high molecular weight polycarbonate composition and evolve carbon dioxide, said dihydric alcohol having the formula HO—R—OH wherein R is selected from the group consisting of alkylene and polyalkylene ether radicals and containing up to 10 carbon atoms and up to 4 ether linkages.

6. The method of claim 5 wherein water is used to generate in situ the dihydric alcohol.

7. The method of claim 5 wherein the dihydric alcohol is ethylene glycol.

8. A method of preparing high molecular weight polycarbonate composition which comprises heating an alkylene carbonate of 3 to 6 carbon atoms containing the radical

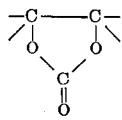

wherein the unsatisfied valences of the carbon atoms are satisfied with a radical selected from the group consisting of hydrogen, alkyl and alkenyl and 0.02 to 0.1 moles of a dihydric alcohol per mole of said alkylene carbonate in the presence of base catalyst to between 100° C. and 250° C. whereby to form high molecular weight polycarbonate composition and evolve carbon dioxide, said dihydric alcohol having the formula HO—R—OH wherein R is selected from the group consisting of alkylene and polyalkylene ether radicals and containing up to 10 carbon atoms and up to 4 ether linkages.

9. A method of preparing high molecular weight polycarbonate composition which comprises heating a 5-membered ring carbonate containing 3 to 6 carbon atoms selected from the group consisting of alkylene and vinylene carbonates and 0.02 to 0.1 moles of a dihydric alcohol per mole of said carbonate in the presence of base catalyst to between 100° C. and 250° C. whereby to form high molecular weight polycarbonate composition and evolve carbon dioxide, said dihydric alcohol having the formula HO—R—OH wherein R is selected from the group consisting of alkylene and polyalkylene ether radicals and containing up to 10 carbon atoms and up to 4 ether linkages.

10. A method of preparing high molecular weight polycarbonate composition which comprises heating ethylene carbonate and 0.02 to 0.1 moles of piperazine per mole of the ethylene carbonate in the presence of base catalyst to between 100° C. and 250° C. whereby to form high molecular weight polycarbonate composition and evolve carbon dioxide.

References Cited by the Examiner

UNITED STATES PATENTS

| 2,210,817 | 8/1940 | Peterson | 260—463 X |
| 2,449,987 | 9/1948 | Gresham | 260—463 |

FOREIGN PATENTS

| 960,603 | 10/1956 | Germany. |

CHARLES B. PARKER, *Primary Examiner.*